United States Patent
Span et al.

(10) Patent No.: US 12,384,447 B2
(45) Date of Patent: Aug. 12, 2025

(54) ELECTRICALLY DRIVEN RACK AND PINION STEERING SYSTEM OF A MOTOR VEHICLE

(71) Applicant: ZF Automotive Germany GmbH, Alfdorf (DE)

(72) Inventors: Eduard Span, Cologne (DE); Yavuz Demir, Lünen (DE); Rainer Engel, Krefeld (DE); Heinz-Dieter Heitzer, Heinsberg (DE)

(73) Assignee: ZF Automotive Germany GmbH, Alfdorf (DE)

( * ) Notice: Subject to any disclaimer, the term of this patent is extended or adjusted under 35 U.S.C. 154(b) by 366 days.

(21) Appl. No.: 17/898,793

(22) Filed: Aug. 30, 2022

(65) Prior Publication Data

US 2023/0074605 A1 Mar. 9, 2023

(30) Foreign Application Priority Data

Sep. 9, 2021 (DE) .................. 102021209996.3

(51) Int. Cl.
*B62D 3/12* (2006.01)
*B62D 5/04* (2006.01)

(52) U.S. Cl.
CPC ............. *B62D 3/12* (2013.01); *B62D 5/0457* (2013.01)

(58) Field of Classification Search
CPC .................................. B62D 3/12; B62D 3/123
See application file for complete search history.

(56) References Cited

U.S. PATENT DOCUMENTS

| | | | | |
|---|---|---|---|---|
| 3,927,576 A * | 12/1975 | Colletti | .................... | F16J 15/52 74/498 |
| 4,301,691 A * | 11/1981 | Walter | .................... | B62D 5/22 403/50 |
| 4,721,175 A * | 1/1988 | Butler | .................... | B62D 5/22 403/50 |
| 6,976,556 B2 * | 12/2005 | Shimizu | ............... | B62D 5/0409 180/444 |
| 7,334,660 B2 * | 2/2008 | Damore | .................... | B62D 5/22 180/428 |

FOREIGN PATENT DOCUMENTS

| | | | | |
|---|---|---|---|---|
| DE | 19947510 A1 | 4/2001 | | |
| DE | 102007042931 A1 * | 3/2008 | ............... | B62D 3/12 |
| DE | 102017101437 A1 | 8/2017 | | |
| FR | 2517785 A1 | 6/1983 | | |
| FR | 2920400 A1 * | 3/2009 | ............... | B62D 3/12 |

* cited by examiner

*Primary Examiner* — Kevin Hurley
(74) *Attorney, Agent, or Firm* — Kristin L. Murphy

(57) ABSTRACT

An electrically driven rack and pinion steering system of a motor vehicle has an axially displaceably mounted rack which transmits a steering movement for steered wheels of the motor vehicle, has an electric drive which provides a steering force and interacts with the rack, and has a housing which receives the rack and a drive element of the drive. The drive element is in engagement with a toothing system of the rack. A bearing assembly is arranged on a section of the rack without a toothing system axially on each side of the drive element, with a carrier cylinder, on the outer shell face of which an outer contact seal is arranged and on the inner shell face of which an inner contact seal is arranged, the contact seals sealing the housing with respect to the rack.

16 Claims, 6 Drawing Sheets

ELECTRICALLY DRIVEN RACK AND PINION STEERING SYSTEM OF A MOTOR VEHICLE

CROSS-REFERENCE TO RELATED APPLICATION

This application claims priority to German Patent Application No. 102021209996.3, filed Sep. 9, 2021, the disclosure of which is incorporated herein by reference in its entirety.

TECHNICAL FIELD

The disclosure relates to an electrically driven rack and pinion steering system of a motor vehicle.

BACKGROUND

A steering movement which a driver carries out on a steering wheel is conventionally transmitted to an axially displaceably mounted rack, the movement of which in turn moves the steered wheels of the motor vehicle in accordance with the steering movement. To this end, the rack is connected at the two ends in each case to a track rod which is in turn coupled to the steered wheels.

The rack runs through a housing of the rack and pinion steering system and protrudes at two opposite ends out of the housing. A penetration of dirt and moisture into the housing has been prevented up to now by way of gaiters which are attached to the housing and cover a ball joint between the track rod and the rack.

If damage occurs to a gaiter, this can be detected, for example, by way of corresponding sensors in the housing of the rack and pinion steering system. Damage is often, however, noticed first of all by the driver himself/herself on account of the changed behavior of the steering system. This option does not arise in the case of autonomously steered motor vehicles, however.

SUMMARY

What is needed is to improve a rack and pinion steering system with regard to the protection against environmental influences, with the result that it can also be used, in particular, in autonomously driving vehicles.

An electrically driven rack and pinion steering system of a motor vehicle, which rack and pinion steering system has an axially displaceably mounted rack which transmits a steering movement for steered wheels of the motor vehicle. Moreover, the rack and pinion steering system comprises an electric drive which provides a steering force and which interacts with the rack, and a housing which receives the rack and a drive element of the drive, the drive element being in engagement with a toothing system of the rack. A bearing assembly is arranged on a section of the rack without a toothing system axially on each side of the drive element, which bearing assembly comprises a carrier cylinder, on the outer shell face of which an outer contact seal is arranged and on the inner shell face of which an inner contact seal is arranged, the contact seals sealing the housing with respect to the rack.

The bearing assemblies seal an interior space of the housing with respect to the surrounding area at the passage points of the rack, in one exemplary arrangement, in a hermetically water-tight and dust-tight manner, and thus protect the region, in which the drive element is in engagement with the rack, against the penetration of moisture and foreign bodies, and therefore provide increased protection against environmental influences. As a result, the service life of the rack and pinion steering system is increased, with the result that it can also be used without problems, in particular, for autonomously driving vehicles.

The conventional gaiters between the housing and the track rod which, in particular, cover the ball joints, via which the rack is connected to the track rods, can be provided in addition.

Since the conventional steering rod can be completely dispensed with in the case of autonomously driving vehicles and also in the case of steer-by-wire systems, the housing can be of considerably more compact design than in the case of conventional rack and pinion steering systems. The electric drive which is connected to the housing is then the only source for a steering force.

The bearing assemblies are arranged at the axial ends of the housing.

It is possible to fill the interior space of the housing axially between the bearing assemblies with a liquid lubricant on account of the satisfactory sealing action of the bearing assemblies.

The carrier cylinder is advantageously generally sleeve-shaped, with the result that it can be simply pushed onto the rack.

In order to seal the bearing assembly with respect to the rack, the inner contact seal has a radially inwardly pointing, peripheral sealing lip which slides on the rack. The sealing lip can be fixed in the bearing assembly, for example, in an annular groove on the inner side of the bearing assembly. The sealing lip can be part of a known shaft sealing ring.

The actual mounting of the rack in the bearing assembly takes place, for instance, by way of a sliding sleeve which is inserted into the carrier cylinder and minimizes the friction between the carrier cylinder and the rack, but does not have to contribute to the sealing action.

In order to seal the bearing assembly with respect to the housing, the outer contact seal is preferably in contact over the entire periphery with an inner wall of the housing, it being possible for the carrier cylinder to be supported elastically with respect to the inner wall of the housing.

The carrier cylinder can generally be arranged in a radially movable manner with respect to the housing, at least on one side of the housing. In one exemplary arrangement, the bearing assembly and therefore also the rack can have a small amount of radial play with respect to the housing as a result of the outer contact seal. For example, a radial play of from ±0.25 mm to ±0.35 mm is provided. This prevents the radial guidance of the rack via the two bearing assemblies at the ends and the additional guidance by way of the drive element in between being overdetermined, which might lead to increased friction.

The outer contact seal can be realized, for example, by way of one or more O-rings.

In one exemplary arrangement, the outer contact seal is arranged axially between the electric drive and a threaded sleeve which is screwed laterally into the housing.

The actual mounting and the sealing of the rack with respect to the housing takes place exclusively by way of the bearing assembly, whereas the rack runs through the threaded sleeve without contact.

A gaiter which seals the ball joint with respect to the track rod can be attached to the threaded sleeve which, to this end, should then have corresponding fastening structures.

The two gaiters are conventionally flow-connected to one another via the interior space of the housing, with the result that pressure differences which arise in the case of the steering movements can be equalized. Since the bearing assemblies seal the interior space of the housing hermetically, a flow connection via an external pressure equalization line is provided.

To this end, there can be a flow connection, for example in the threaded sleeve, in the bearing assembly and in the housing, from a gaiter which adjoins the housing to a pressure equalization line. For example, the threaded sleeve is designed in such a way that an annular space is formed between the threaded sleeve and the rack, through which annular space the air can pass from the gaiter to the inner side of the housing and, via the latter, to the pressure equalization line. The threaded sleeve and/or the bearing assembly possibly have/has suitable further structures for the flow connection.

The pressure equalization line runs, for example, externally outside the housing, it being possible for connector pieces to be used in the housing, to which connector pieces the pressure equalization line is connected, and which connector pieces are flow-connected to the interior space of the housing.

In one possible variant, the carrier cylinder is connected in one piece to the threaded sleeve. The radial and axial position of the bearing assembly is then defined via the threaded sleeve, and the bearing assembly is received in the housing without axial and radial play.

In order to establish a flow connection to the pressure equalization line from the threaded sleeve, the threaded sleeve has, in this case, a radial through opening, for example, to the annular space between the inner side of the housing and the outer side of the rack.

In another possible variant, the carrier cylinder and the threaded sleeve are separate components which are arranged directly adjacently. In this case, the threaded sleeve preferably defines an axially outer stop for the bearing assembly.

The bearing assembly itself can be received in the housing radially and/or axially with play. In particular, the bearing assembly can be received in the housing such that it can be displaced radially and/or axially.

A combination of the two variants at opposite ends of the housing is advantageous, in order to avoid overdetermination of the position of the rack.

The axial positioning of the bearing assembly with respect to the housing can be fixed simply by way of a shoulder which is configured on the inner side of the housing and with which the bearing assembly is in contact in the inserted state. It can also be defined via the arrangement of the shoulder whether the bearing assembly is arranged axially non-displaceably with respect to the housing or is given a small amount of axial play.

In this case, identical threaded sleeves and bearing assemblies can be used at the two axial ends of the housing, the position of the shoulder at one end being selected in such a way that the bearing assembly is held in the housing without axial play and, at the opposite end, the shoulder is arranged at a somewhat greater axial spacing from the end of the housing, with the result that the bearing assembly has a predefined small amount of axial play in the housing.

If axial play of the bearing assembly is to be avoided, the carrier cylinder of the bearing assembly can also be fixed, for example, via a circlip on the inner side of the housing.

A flow connection from the annular space of the threaded sleeve to the pressure equalization line can possibly be formed by way of a radial groove at that end of the carrier cylinder which points toward the threaded sleeve, which radial groove forms a flow channel to the pressure equalization line.

A pressing apparatus which acts on the drive element and the rack is preferably provided, which pressing apparatus ensures a satisfactory mechanical contact between the drive element and the toothing system of the rack. Here, for example, a variable yoke can be used which engages around the rack and is prestressed resiliently in the direction of the drive element.

The drive element is positioned approximately in the axial center of the rack, such that a homogeneous distribution of force to the rack results.

In order to achieve low-tolerance positioning of the drive element, the housing has two bearing points for the drive element. It is advantageous, if the bearing points are configured in one piece with the housing and are thus defined by way of a shape of the housing. The housing can be, for example, a high-pressure diecast component.

A pinion, for example, has proven suitable as a drive element, since it makes a smaller overall size of the housing possible than with a conventional recirculating ball mechanism.

BRIEF DESCRIPTION OF DRAWINGS

In the following text, the disclosure will be described in greater detail on the basis of a plurality of exemplary arrangements with reference to the appended figures, in which.

DETAILED DESCRIPTION

Figure 1:
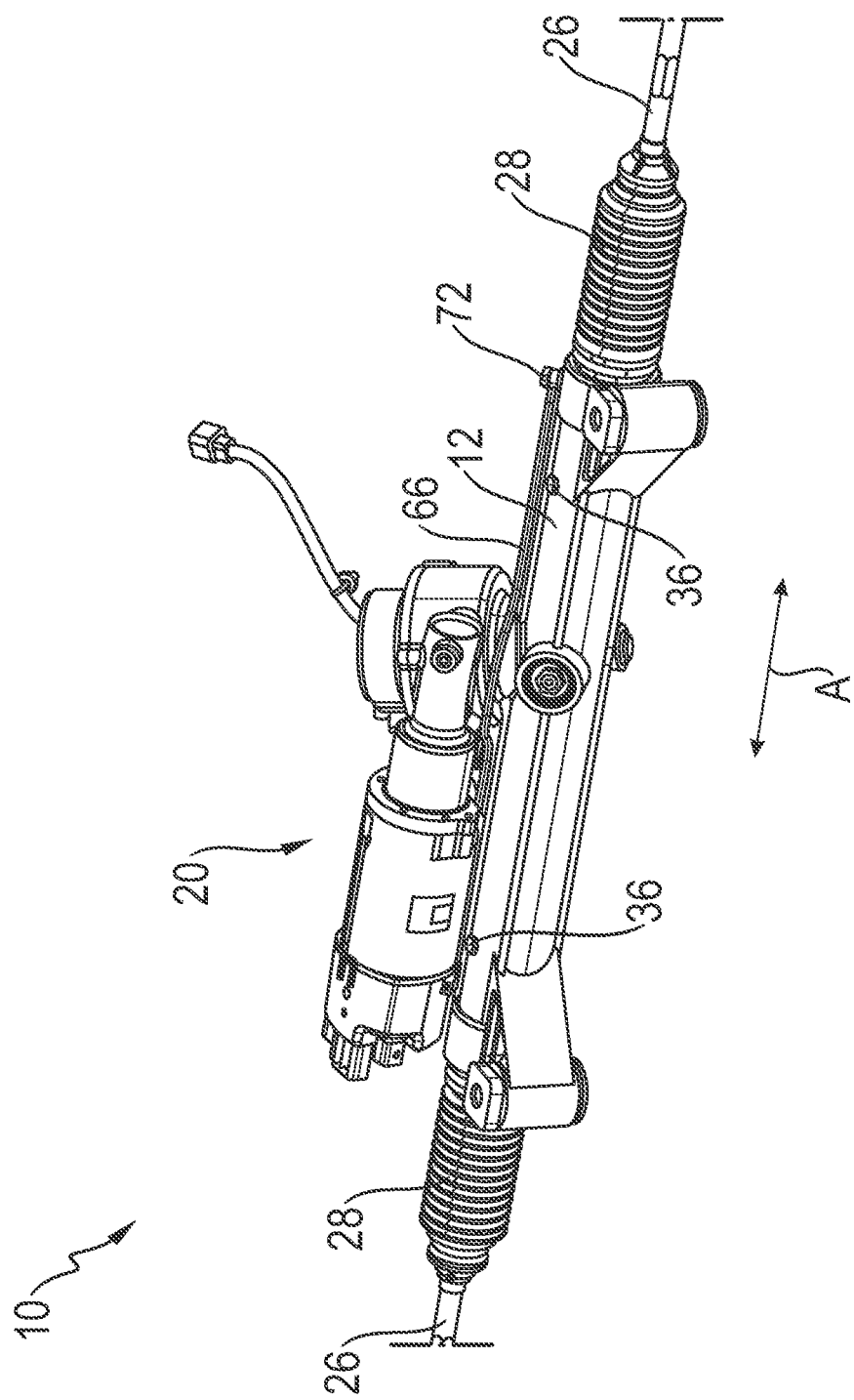
FIG. 1 shows a diagrammatic perspective illustration of a rack and pinion steering system according to the disclosure, FIG. 2 diagrammatically shows the construction of the rack and pinion steering system from FIG. 1.
Figure 2:
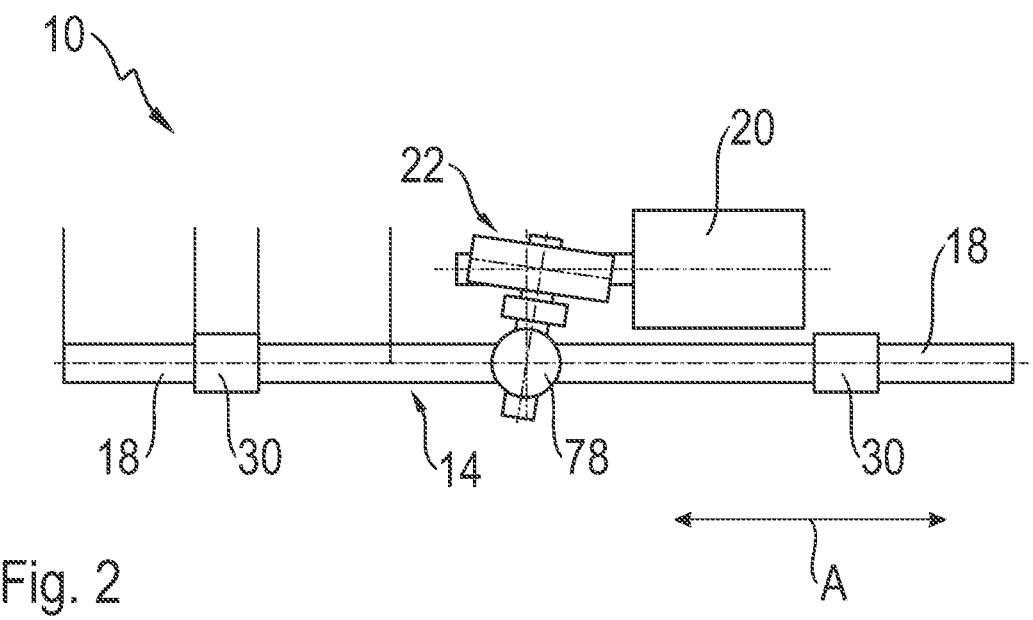

The figures show an electrically driven rack and pinion steering system 10, the housing 12 of which surrounds an axially displaceably mounted rack 14 peripherally, the rack 14 protruding out of the housing 12 at the axial ends of said housing 12. In an axial central section, the rack 14 has a toothing system 16 (see FIG. 8). The axial ends are configured as sections 18 without a toothing system.

The axial direction A is specified by way of the longitudinal direction of the rack 14.

Figure 9:
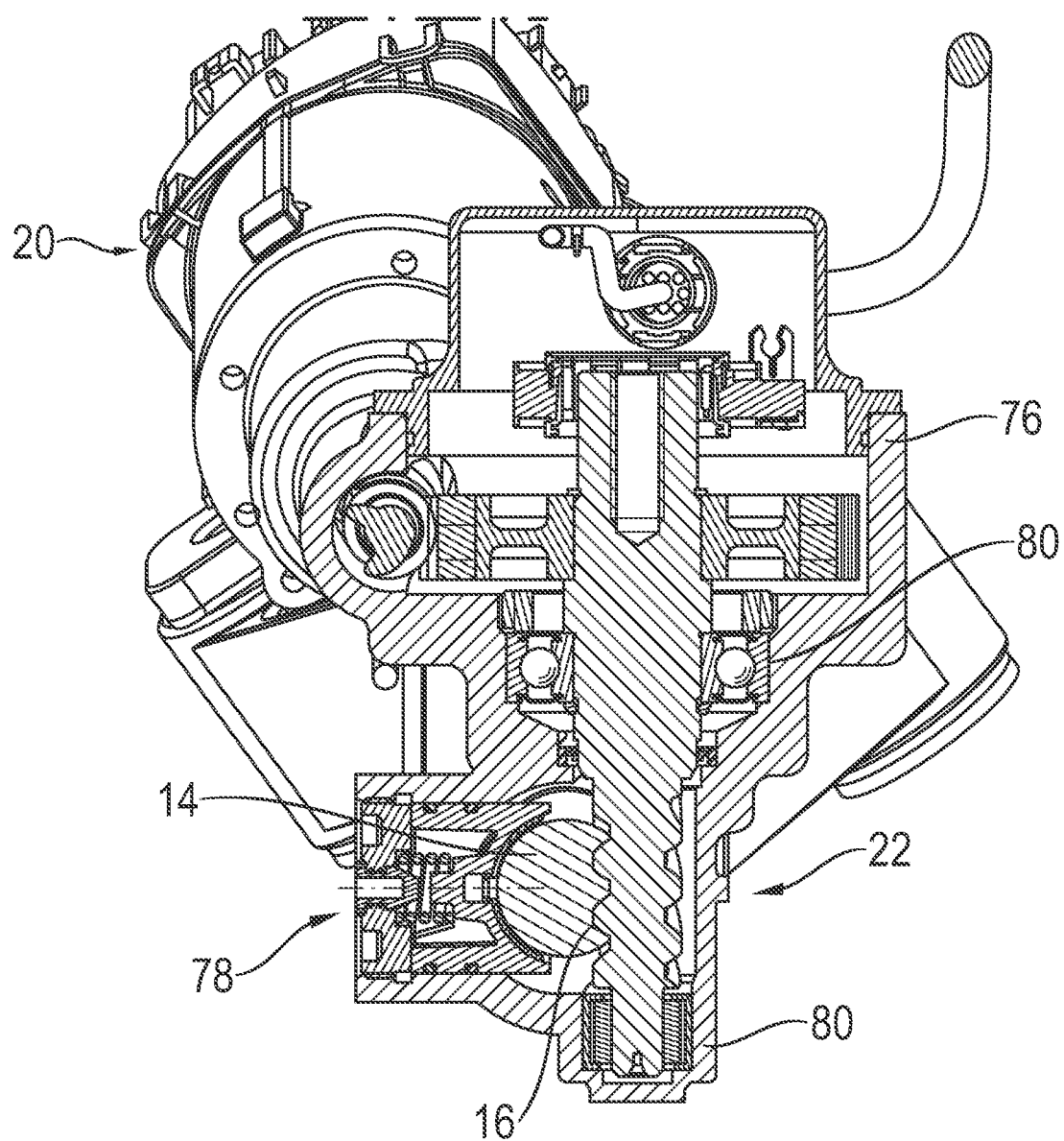
FIG. 9 shows a diagrammatic partially sectioned illustration of the drive of the rack and pinion steering system according to the disclosure.

An electric drive 20, an electric motor here, moves a drive element 22 which is in engagement with the toothing system 16, with the result that the rack 14 can be displaced in both directions along the axial direction A by way of operation of the drive 20 (see also FIG. 9). As a result, a steering force is provided for the steered wheels of the vehicle.

Here, the rack 14 is connected at the two axial ends via a ball joint 24 to a track rod 26, with the result that an axial movement of the rack 14 can be transmitted via the track rods 26 as a steering movement to the steered wheels (not shown) of a motor vehicle.

The transition from the track rod 26 to the housing 12 is protected against environmental influences in each case by way of a gaiter 28. The gaiter 28 also covers the ball joint 24.

Figure 8:
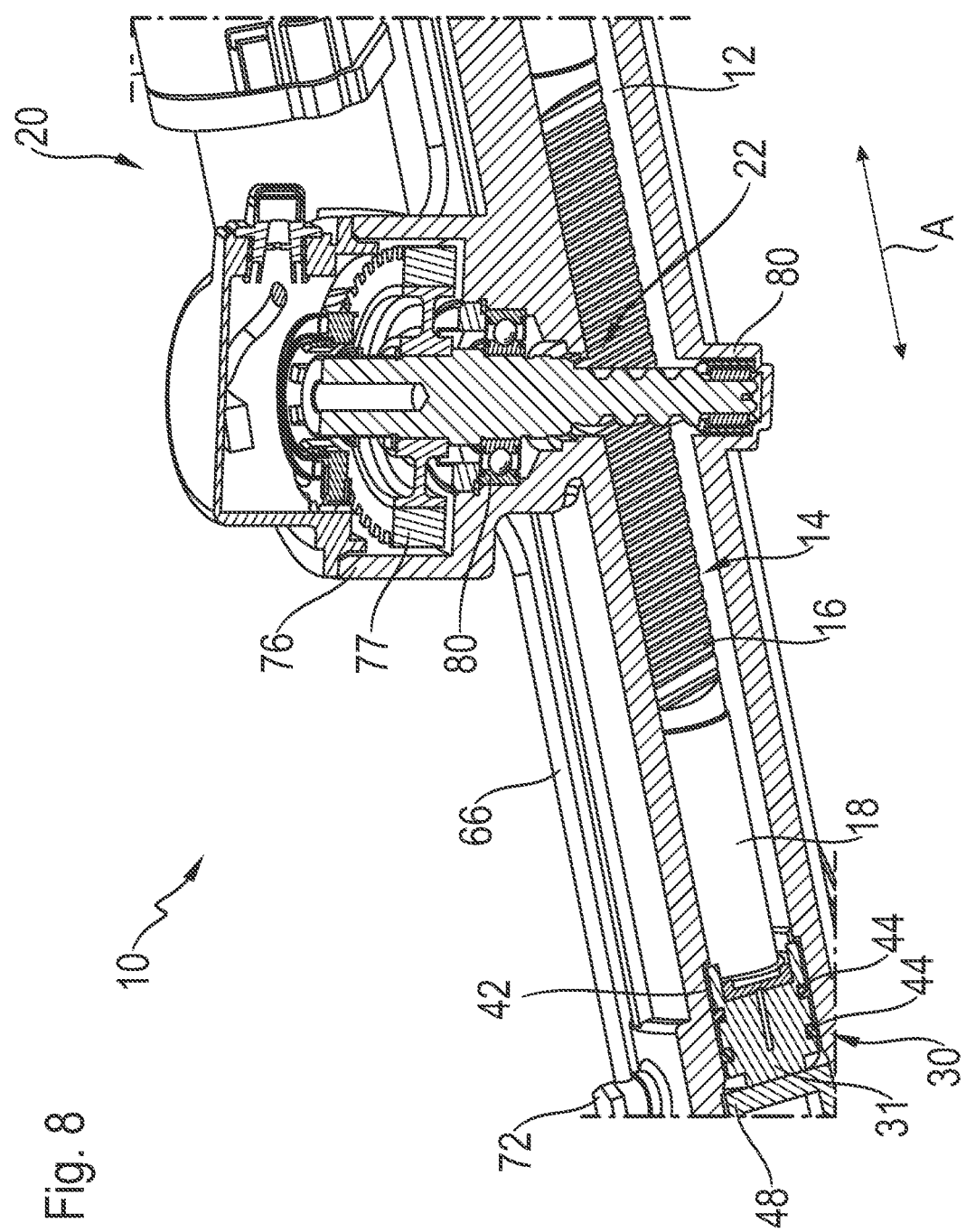
FIG. 8 shows a diagrammatic sectional view of the rack and pinion steering system from FIG. 1 in the region of a drive.

As FIG. 8 shows, for example, in each case one bearing assembly 30 is inserted into the housing 12 at the axial ends of the housing 12, through which bearing assemblies 30 the rack 14 extends. Therefore, in each case one bearing assembly 30 is arranged on the two sides of the drive 20. The bearing assemblies 30 are situated on the sections 18 of the rack 14 without a toothing system.

The bearing assemblies 30 close off an interior space 32 of the housing 12 hermetically with respect to the surrounding area.

In this example, the interior space 32 is filled with a liquid lubricant which fills, in particular, an annular space between an inner side 34 of the housing 12 and the rack 14. Here, the interior space 32 is accessible from the outside via openings 36 (shown in FIG. 1) in the wall of the housing 12, in order to pour in lubricant.

Figure 3:
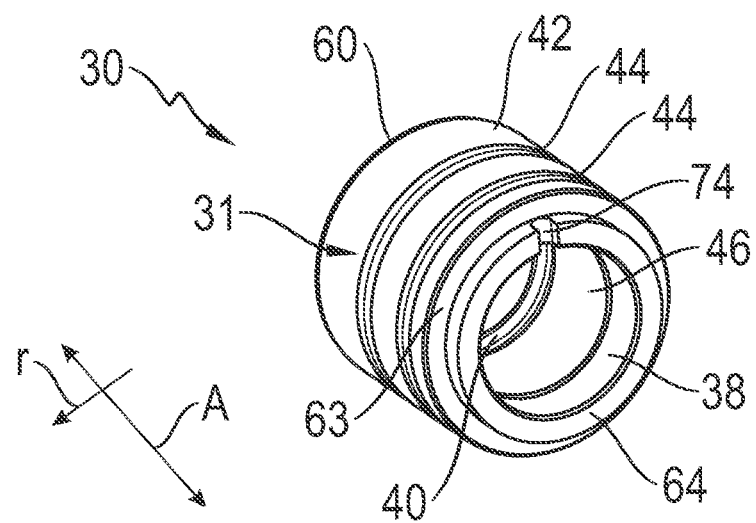
FIG. 3 shows a diagrammatic perspective illustration of a bearing assembly of the rack and pinion steering system according to the disclosure.

The bearing assembly 30 is shown separately in FIG. 3.

A main constituent part is a dimensionally stable carrier cylinder 31 which is single-piece and substantially sleeve-shaped here.

In order to seal the carrier cylinder 31 with respect to the rack 14, an inner contact seal 40 is arranged on a radially inner shell face 38, which inner contact seal 40 comprises, here, a radially inwardly pointing sealing lip which runs around peripherally and bears in a peripherally closed manner against one of the sections 18 of the rack 14 without a toothing system.

Figure 5:
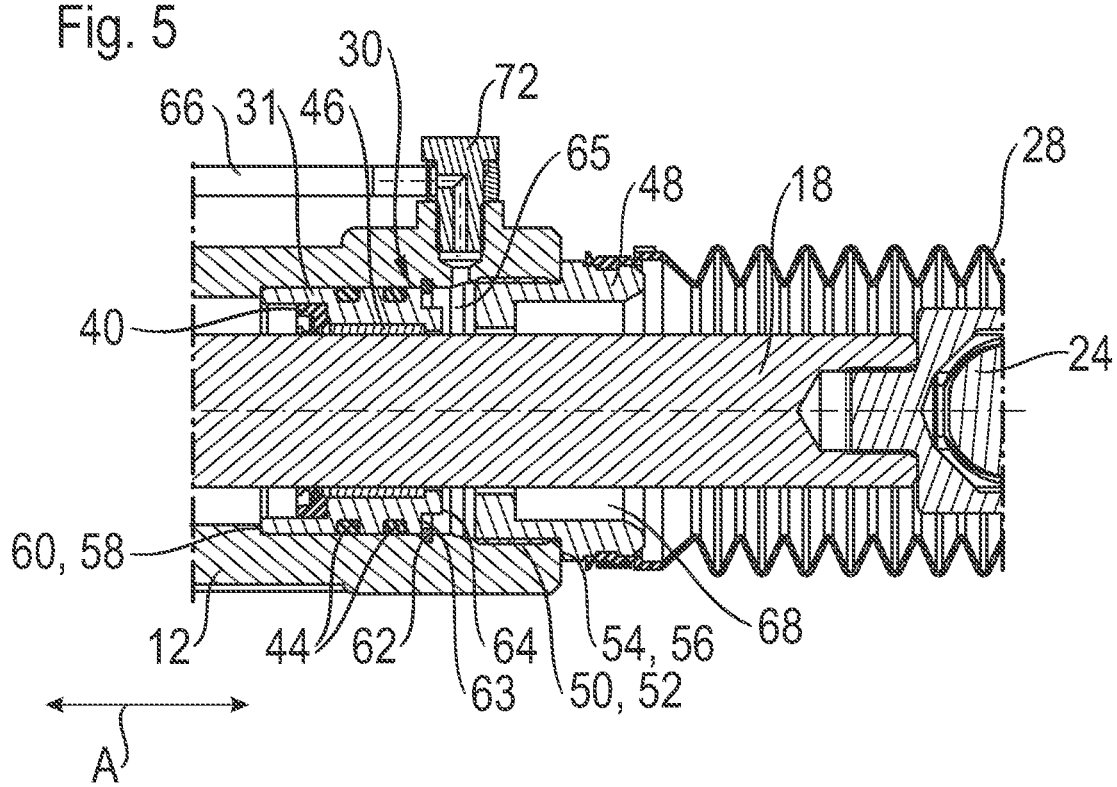
Figure 6:
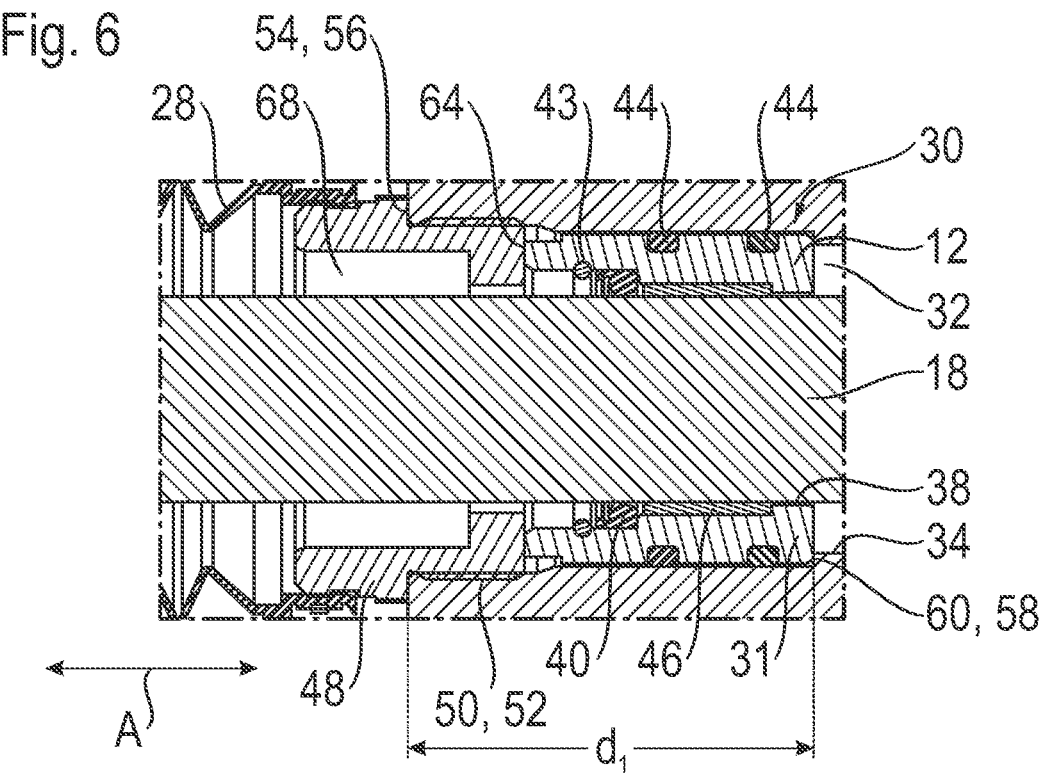
FIGS. 6 and 7 show diagrammatic sectional views of the rack and pinion steering system according to the disclosure in accordance with a second exemplary arrangement, FIG. 6 showing the arrangement of the bearing assembly at one axial end of the housing, and FIG. 7 showing the arrangement of the bearing assembly at the opposite axial end of the housing.
Figure 7:
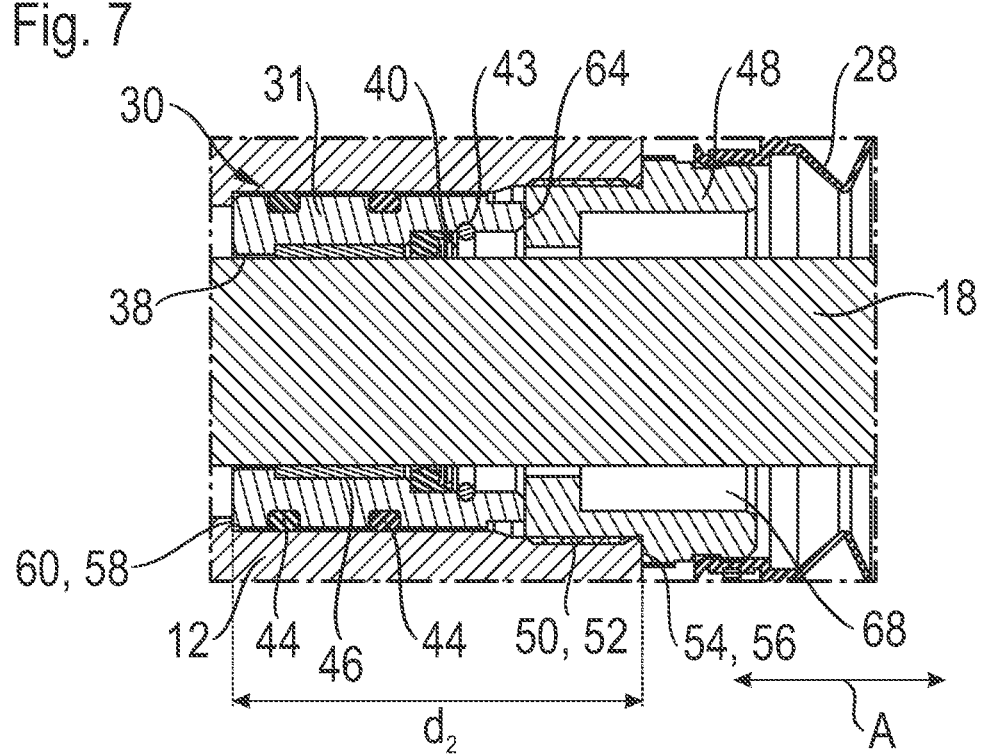

The inner shell face 38 optionally has an annular groove 43 which receives, for example, a circlip which fixes the contact seal 40 axially on the carrier cylinder 31 between the circlip and a shoulder on the radially inner shell face 38, as is shown in FIGS. 6 and 7. The contact seal 40 can also optionally bear against other suitable bearing faces on the inner shell face 38, as FIGS. 4 to 7 show.

A radially outer contact seal 44, in the form here of two parallel O-rings, is arranged on a radially outer shell face 42 of the carrier cylinder 31 for a sealing action with respect to the inner side 34 of the housing 12. Here, the O-rings are inserted into two parallel annular grooves on the outer shell face 42 of the carrier cylinder 31 (see also FIGS. 4 to 7).

For mounting, the carrier cylinder 31 can be pushed simply onto the sections 18 of the rack 14. The outer shell face 42 of the carrier cylinder 31 and the inner side 34 of the housing 12 in the region of the bearing assembly 30 are circular-cylindrical in these examples.

The rack 14 extends through the two bearing assemblies 30, and can be displaced axially with respect to the latter for the transmission of the steering movement to the steered wheels.

In order to reduce the friction, a sliding sleeve 46 is received here in each carrier cylinder 31, which sliding sleeve 46 is arranged radially between the rack 14 and the carrier cylinder 31 and is in direct contact with the section 18 of the rack 14 and with the inner shell face 38 of the carrier cylinder 31. The sliding sleeve 46 is arranged offset axially toward the drive 20 with respect to the inner contact seal 40 and therefore does not need to develop any sealing action.

The outer contact seal 44 optionally makes a small amount of radial play of the bearing assembly 30 with respect to the inner side 34 of the housing 12 possible, since the bearing assembly 30 is supported elastically on the inner side 34 by means of the contact seal 44. In this case, a small radial relative movement is possible between the rack 14 and the housing 12.

The bearing assemblies 30 are secured in the direction of the axial housing ends in each case by way of a threaded sleeve 48, each threaded sleeve 48 having an external thread 50 which engages into a corresponding internal thread 52 on the inner side 34 of the housing 12. An axial shoulder 54 on the threaded sleeve 48, which axial shoulder 54 comes into contact with an axial end face 56 of the housing 12, defines the correct screw-in position of the threaded sleeve 48.

The threaded sleeve is not in direct contact with the rack 14.

In this example, the gaiter 28 is fixed at the free axial end of the threaded sleeve 48.

Figure 4:
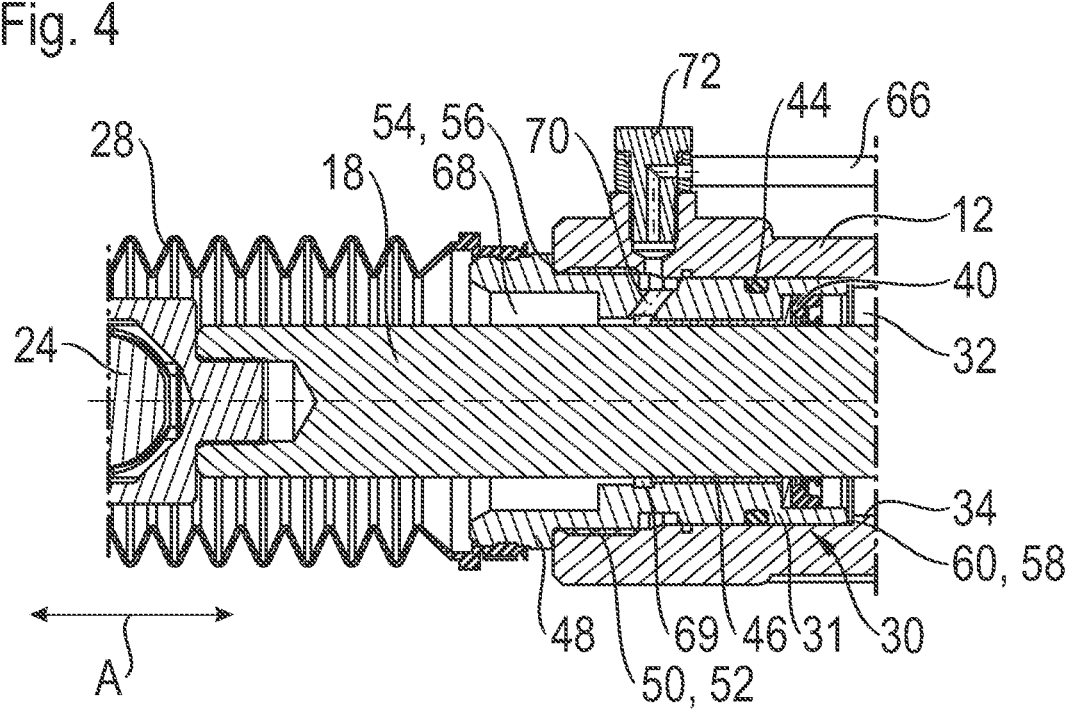
FIGS. 4 and 5 show diagrammatic sectional views of the rack and pinion steering system according to the disclosure in accordance with a first exemplary arrangement, FIG. 4 showing the arrangement of the bearing assembly at one axial end of the housing, and FIG. 5 showing the arrangement of the bearing assembly at the opposite axial end of the housing.

In the case of the first exemplary arrangement which is shown in FIGS. 4 and 5, one of the bearing assemblies 30 (here, the bearing assembly 30 shown in FIG. 4 at the left-hand axial end of the housing 12) is connected in one piece to the threaded sleeve 48. The axial and the radial position of the bearing assembly 30 is therefore determined completely by way of the threaded sleeve 48.

FIG. 5 shows the opposite axial end of the housing 12. Here, the bearing assembly 30 and the threaded sleeve 48 are designed as separate components. The bearing assembly 30 is arranged in the housing 12 at an axial spacing from the threaded sleeve 48, a shoulder 58 on the inner side 34 of the housing 12 forming a stop for an axial end 60 of the bearing assembly 30. In order to fix the bearing assembly 30 axially, a circlip 62 is provided here which bears against a shoulder 63 at that axial end 64 of the carrier cylinder 31 which lies opposite the axial end 60, and engages into a radial groove on the inner side 34 of the housing 12.

In this way, an axial intermediate space 65 is produced between the carrier cylinder 31 and the threaded sleeve 48.

In this example, the bearing assembly 30 is fixed axially, but has a certain amount of radial play radially as a result of the contact seal 44 on its outer shell face 42.

The interior spaces of the two gaiters 28 are flow-connected to one another via a pressure equalization line 66 which runs outside the housing 12. To this end, the threaded sleeve 48, the housing 12 and the bearing assembly 30 have suitable structures.

At that axial end of the rack 14 which is shown in FIG. 4, the flow connection from the interior space of the gaiter 28 to the pressure equalization line 66 takes place via an annular space 68 between the inner side of the threaded sleeve 48 and the outer side of the section 18 of the rack 14, via an annular groove 69 on the inner shell face 38 of the carrier cylinder 31, into which annular groove 69 the annular space 68 merges, and via a branch duct 70 which runs from the annular groove 69 radially through the threaded sleeve 48 to a connector piece 72 which is inserted radially into the housing 12 and to which the pressure equalization line 66 is connected.

At that axial end of the rack 14 which is shown in FIG. 5, the axial intermediate space 65 between the threaded sleeve 48 and the carrier cylinder 31 is in a flow connection to the annular space 68 of the threaded sleeve 48, with the result that air can pass from the interior of the gaiter 28 through the annular space 68 into the intermediate space between the threaded sleeve 48 and the bearing assembly 30. Said intermediate space 65 is in a flow connection to a connector piece 72 in the housing 12.

The two connector pieces 72 are connected to one another via the pressure equalization line 66.

As an alternative to the pressure equalization line 66, an axial bore might also be provided in the rack 14, which axial bore connects the interior spaces of the two gaiters 28 to one another.

Here, the housing 12 is of identical design at the two axial ends, with the result that the arrangement of the fixed bearing assembly 30 and the bearing assembly 30 which is mounted in a floating manner can be selected depending on the situation.

In the case of the second exemplary arrangement which is shown in FIGS. 6 and 7, a threaded sleeve 48 and a bearing assembly 30 which is separate from it are arranged in each case at the two axial ends of the housing 12. The threaded sleeves 48 and the bearing assemblies 30 are identical for the two housing ends here.

As in the above-described first exemplary arrangement, the bearing assembly 30 is pushed onto the rack 14, and the threaded sleeve 48 is screwed into the axial end of the housing 12, with the result that the threaded sleeve 48 is firmly fixed axially and radially with respect to the housing 12.

At that axial end of the housing 12 which is shown in FIG. 6, the shoulder 58 is arranged on the inner side 34 of the housing 12, against which the axial end 60 of the bearing assembly 30 bears, at an axial spacing $d_1$ from the shoulder 54, by way of which the threaded sleeve 48 bears against the end face 56 of the housing 12. The spacing $d_1$ is selected in such a way that the bearing assembly 30 is axially directly in contact with the threaded sleeve 48, and therefore does not have any axial play in the interior of the housing 12.

At the opposite end which is shown in FIG. 7, the shoulder 58 is arranged at a spacing $d_2$ from the shoulder 54, which spacing $d_2$ is slightly greater than the spacing $d_1$. Therefore, the bearing assembly 30 is arranged at this axial end of the housing 12 such that it can be moved within the housing 12 in the axial direction A with a small amount of play.

The pressure equalization between the two gaiters 28 likewise takes place in this example via a pressure equalization line 66 (not shown here) which is connected via connector pieces 72 (likewise not shown) to the inner side 34 of the housing 12. In order to provide a flow connection from the annular space 68 within the threaded sleeve 48 to the pressure equalization line 66, the carrier cylinder 31 of the bearing assembly 30 has a radial groove 74 at the axial end 64, which radial groove 74 leads from the inner shell face 38 of the carrier cylinder 31 to its outer shell face 42.

In the region of the radial groove 74, the outer shell face 42 is offset radially inward slightly starting from the end 64, by way of which the shoulder 63 is also formed. The radial groove 74 extends from the end 64 as far as the shoulder 63. In this way, a further annular space is formed in the region of the axial end 64 of the bearing assembly 30, which further annular space is arranged between the threaded sleeve 48 and the carrier cylinder 31, and via which further annular space a flow connection to the pressure equalization line 66 is established.

In the examples which are shown here, the drive element 22 is configured as a pinion which engages into the toothing system 16 of the rack 14. This is shown in FIGS. 8 and 9.

The housing 12 has an integrally formed receptacle 76 for the drive element 22 and further parts of the drive 20, in particular for a driven worm gear 77 which is connected via a shaft to the pinion. A pressing apparatus 78 is also arranged in the receptacle 76, which pressing apparatus 78 applies a pressing force F laterally in the direction of the rack 14 and of the drive element 22, and thus ensures satisfactory contact between the rack 14 and the drive element 22.

Moreover, the receptacle 76 has two bearing points 80 for the drive element 22, which two bearing points 80 are provided on the two axial sides of the pinion. Since both the pressing apparatus 78 and the two bearing points 80 are arranged in regions which are connected in one piece to the housing 12, very small tolerances can be implemented and undesired relative movements between the drive element 22 and the rack 14 can be reduced.

The invention claimed is:

1. An electrically driven rack and pinion steering system of a motor vehicle with an axially displaceably mounted rack which transmits a steering movement for steered wheels of the motor vehicle, comprising an electric drive which provides a steering force and interacts with the rack, a housing which receives the rack and a drive element of the electric drive, wherein the drive element is in engagement with a toothing system of the rack, a bearing assembly being arranged on a section of the rack without a toothing system axially on each side of the drive element, with a carrier cylinder, on the outer shell face of which an outer contact seal is arranged and on an inner shell face of which an inner contact seal is arranged, the contact seals sealing the housing with respect to the rack; wherein the carrier cylinder is arranged such that it can be moved radially with respect to the housing.

2. The rack and pinion steering system as claimed in claim 1, wherein the inner contact seal has a radially inwardly pointing, peripheral sealing lip which slides on the rack.

3. The rack and pinion steering system as claimed in claim 1, wherein the outer contact seal is arranged axially between the electric drive and a threaded sleeve which is screwed laterally into the housing.

4. The rack and pinion steering system as claimed in claim 3, the threaded sleeve having a flow connection from a gaiter, adjoining the housing, and a pressure equalization line.

5. The rack and pinion steering system as claimed in claim 3, the carrier cylinder and the threaded sleeve being separate components which are arranged directly adjacently.

6. The rack and pinion steering system as claimed in claim 5, the carrier cylinder being received radially and/or axially displaceably in the housing.

7. The rack and pinion steering system as claimed in claim 1, further comprising, a pressing apparatus which acts on the drive element and the rack.

8. The rack and pinion steering system as claimed in claim 7, the housing having two bearing points for the drive element.

9. The rack and pinion steering system as claimed in claim 1, wherein the outer contact seal is in contact with an inner side of the housing and supports the carrier cylinder elastically with respect to the inner side of the housing.

10. The rack and pinion steering system as claimed in claim 1, wherein the carrier cylinder is arranged such that it can be moved radially with respect to the housing.

11. The rack and pinion steering system as claimed in claim 1, the outer contact seal is arranged axially between the electric drive and a threaded sleeve which is screwed laterally into the housing.

12. The rack and pinion steering system as claimed in claim 4, the carrier cylinder being connected in one piece to the threaded sleeve.

13. The rack and pinion steering system as claimed in claim 4, the carrier cylinder and the threaded sleeve being separate components which are arranged directly adjacently.

14. The rack and pinion steering system as claimed in claim 13, the carrier cylinder being received radially and/or axially displaceably in the housing.

15. The rack and pinion steering system as claimed in claim 1, further comprising, a pressing apparatus which acts on the drive element and the rack.

16. An electrically driven rack and pinion steering system of a motor vehicle with an axially displaceably mounted rack which transmits a steering movement for steered wheels of the motor vehicle, comprising an electric drive which provides a steering force and interacts with the rack, a housing which receives the rack and a drive element of the electric drive, wherein the drive element is in engagement with a toothing system of the rack, a bearing assembly being arranged on a section of the rack without a toothing system axially on each side of the drive element, with a carrier cylinder, on the outer shell face of which an outer contact seal is arranged and on an inner shell face of which an inner contact seal is arranged, the contact seals sealing the housing with respect to the rack, wherein the outer contact seal is arranged axially between the electric drive and a threaded sleeve which is screwed laterally into the housing, and wherein the carrier cylinder is connected in one piece to the threaded sleeve.

* * * * *